H. J. WATTS.
FLOATING TOOL CHUCK.
APPLICATION FILED DEC. 5, 1919.
1,424,535.
Patented Aug. 1, 1922.
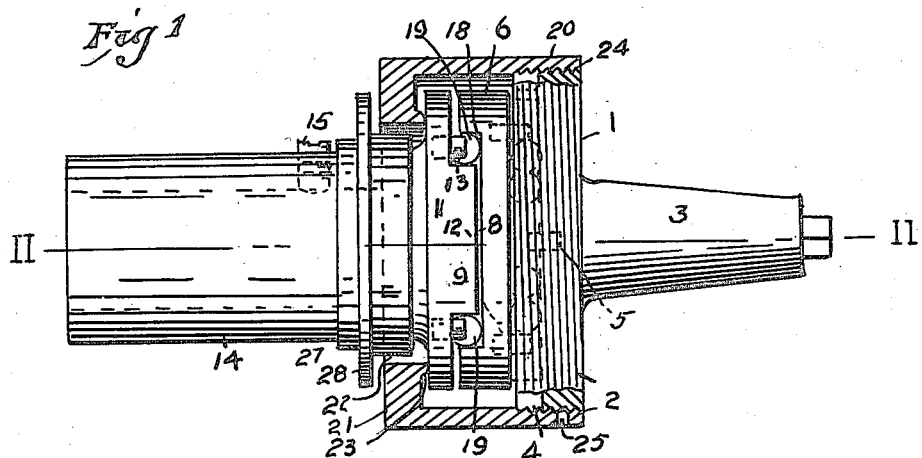
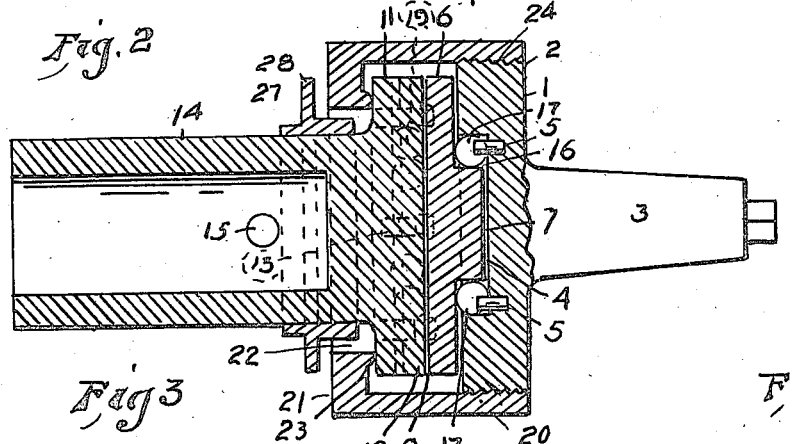
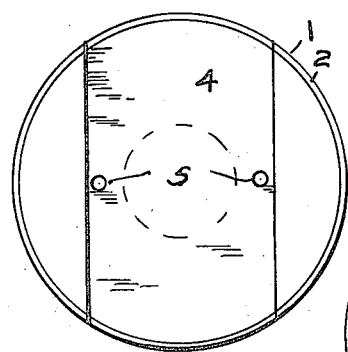
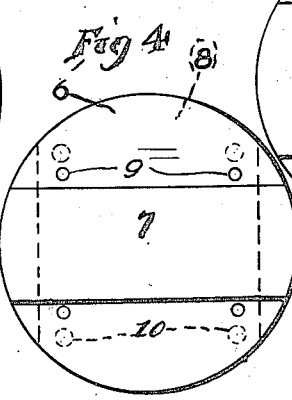
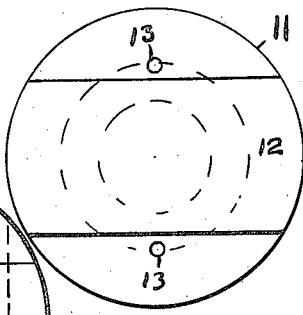
Witness
R.F.Dilworth
Inventor
Harry J. Watts
By Jack Snyder
Attorney

UNITED STATES PATENT OFFICE.

HARRY J. WATTS, OF TURTLE CREEK, PENNSYLVANIA.

FLOATING TOOL CHUCK.

1,424,535.  Specification of Letters Patent.  Patented Aug. 1, 1922.

Application filed December 5, 1919. Serial No. 342,779.

*To all whom it may concern:*

Be it known that I, HARRY J. WATTS, a subject of the King of England, residing at Turtle Creek, in the county of Allegheny and State of Pennsylvania, have invented certain new and useful Improvements in Floating Tool Chucks, of which the following is a specification.

This invention relates to a floating tool chuck and has for its object to provide a chuck of such class, in a manner as hereinafter set forth, with means to allow the tool, carried by the chuck, to travel in a path corresponding to the length and angles of a polygonal figure, having any desired number of lines or angles, when boring or drilling a polygonal-shaped opening whereby the opening drilled or bored will correspond to the shape of the figure.

A further object of the invention is to provide the chuck, with means in a manner as hereinafter set forth, for variably limiting the range of the floating action of the chuck.

A further object of the invention is to provide the chuck, with means in a manner as hereinafter set forth, to reduce friction to a minimum between that element of the chuck carrying the tool and the enclosing casing for said element during the operation of drilling or boring.

A further object of the invention is to provide a chuck, with means in a manner as hereinafter set forth, with bearing balls between the shifting element of the chuck for reducing friction to a minimum and further to facilitate a smooth shifting movement during the operation of said shifting elements.

Further objects of the invention are to provide a floating tool chuck which is simple in its construction and arrangement, strong, durable, compact, readily assembled, efficient and convenient in its use, and comparatively inexpensive to manufacture.

With the foregoing and other objects in view the invention consists of the novel construction, combination and arrangement of parts as hereinafter set forth, and illustrated in the accompanying drawings, wherein is shown an embodiment of the invention, but it is to be understood that changes, variations and modifications can be resorted to which come within the scope of the claims hereunto appended.

In the drawings wherein like reference characters denote corresponding parts throughout the several views:—

Figure 1, is an elevation partly in section of a floating tool chuck in accordance with this invention.

Figure 2, is a longitudinal sectional view, on line II—II Figure 1.

Figure 3, is an inverted plan of the upper or shank element of the chuck.

Figure 4, is a top plan of the intermediate or coupling member of the chuck.

Figure 5, is a top plan of the lower or tool carrying member of the chuck.

A floating tool chuck in accordance with this invention comprises a plurality, as shown three, of superposed elements or members, one a shank element, another a coupling element and the third a tool carrying element, of disk like form and with the coupling element inter-engaging with the other two elements. The shank element is of greater diameter than the other elements and is indicated at 1, and has its periphery provided with threads, as at 2, and further has formed integral with its outer face, a shank 3, for the purpose of connecting the chuck with a driving means therefor. The inner or lower face of the shank element 1, is provided with a wide transverse groove 4, which forms what may be termed a pocket and which extends throughout the said inner face. Centrally of the top wall of the groove 4 and in close proximity to each side wall of said groove, is a depending stud 5 and the said studs are arranged opposite each other. The element 1 is circular and the studs 5 provide stops as hereinafter referred to.

The intermediate or coupling element, as indicated at 6, is circular in form and has its upper face provided with a wide transverse offset extending throughout said face and which is indicated at 7. The lower face of the element 6 is formed throughout with a transverse groove 8 which extends at an angle with respect to the offset 7. The offset 7 and groove 8 are disposed centrally of the faces of the element 6. The offset 7 is of less width than the groove 8. The upper face of the element 6 is provided with four upwardly extending studs 9, arranged in pairs, the studs of each pair are positioned, one at each side of the offset 7. The lower face of the element 6, in the top wall of the groove 8, near each end thereof and in proximity to each side of the groove 8, has a depending stud 10. The studs near each end of the groove 8 are arranged opposite each other, and provide stops to be hereinafter referred to. The studs 9 are out of alinement with the studs 10.

The tool carrying element is circular in form, is indicated at 11, and is of the same diameter as the element 6. The upper face of the element 11 is formed throughout with a transverse offset 12 and which extends at an angle with respect to the offset 7 and groove 4. Centrally of the upper face of the element, 11, in proximity to each side of the offset 12, an upwardly extending stud 13 is arranged. The studs 13 provide stops to be presently referred to. Depending from the lower face of the element 11, centrally thereof, is a socket forming member 14, for the reception of a tool, not shown, and the member 14 is provided with a set screw 15, for the tool.

The side walls of the grooves 4 and 8 and the side walls of the offsets 7 and 12 are plane. The width of the offset 12 is less than the width of the groove 8. The offset 7 extends into the groove 4 and in connection with the side walls of said groove, as well as the top wall thereof and also the upper face of the element 6, provides ball races 16, for the bearing balls 17, these latter having four points of contact with the walls of the race. The studs 5 depend into the race 16 centrally thereof and stop the shifting action of the balls 17 or rather limit the shifting action of the balls. They also co-act with the studs 9 which project up into the race or rather races, as two are formed, at the ends thereof. The studs 9 arrest shifting movement of the element 6 relative to the element 1.

The offset 12 extends into the groove 8 and in connection with the side walls of said groove, the bottom wall thereof and the upper face of the element 11 provides ball races 18 for the bearing balls 19, these latter having four points of contact with the walls of the race. The studs 13 extend into the races 18, centrally thereof and limit shifting action of the balls 19, and which also coact with the studs 10 which depend into the races 18, at the ends thereof. The studs 10 arrest the shifting movement of the elements 6 and 11 relatively to each other.

The elements 1, 6 and 11 are enclosed and coupled together by an annular casing 20, open at its top and having its bottom of materially greater thickness, than its body, and further having its bottom 21, formed with an opening 22, through which depends the member 14, the latter being of less diameter than the opening 22 to provide for the floating action of the chuck. The bottom 21 of the casing 20 in proximity to the edge of the opening 22 is formed with an upwardly extending continuous rounded rib 23 on which is mounted the element 11, and which is employed to reduce friction during the shifting movement of the element 11. The casing 20, on its inner face at the upper portion thereof has threads 24 for engagement with threads on the element 1 whereby the casing is secured in position. The casing 20 is locked by a set screw 25 whereby the latter when adjusted will be maintained in position.

For the purpose of variably limiting the range of the floating action of the chuck, a range-limiting element is provided and which consists of a collar 27, formed of two different diameters, and which is provided with a lateral flange 28. The collar 27 is frictionally mounted on the member 14, at the opening 22, or rather so that a portion of the collar will extend into said opening, the arrangement being such that if the portion of greater diameter of the collar, extends into the opening 22, the floating action will be less than if the portion of smaller diameter extends into said opening. The collar is mounted so that it can be readily removed and reversed when desired. The flange 28 constitutes what may be termed a dust guard to protect the elements within the casing from dirt and chips, and further enables the convenient handling of the collar.

What I claim is:—

1. A floating tool chuck comprising a shank carrying element, a shiftable element carrying a socket-forming-member for the reception of a tool, a shiftable coupling element interposed between and interengaging with the other of said elements, said shank carrying element of greater diameter than the other of said elements, and a casing secured to the periphery of the shank carrying element and enclosing the other of said elements, said casing formed at its lower end with an inwardly extending flange disposed at right angles with respect to the body of the casing and through which extends said member, said flange formed with an upwardly extending supporting rib for the shiftable element carrying the socket forming member and of less diameter than said member.

2. A floating tool chuck comprising a tool carrying element, means for imparting a floating action to the tool carried by said element during the operation of the chuck, an enclosing casing for said means and element, said casing having an inwardly extending flange formed on its upper face at the free edge thereof with a vertical rib on which is seated said element.

In testimony whereof I affix my signature.

HARRY J. WATTS.